US006879954B2

(12) United States Patent
Nguyen et al.

(10) Patent No.: US 6,879,954 B2
(45) Date of Patent: Apr. 12, 2005

(54) PATTERN MATCHING FOR LARGE VOCABULARY SPEECH RECOGNITION SYSTEMS

(75) Inventors: Patrick Nguyen, Santa Barbara, CA (US); Luca Rigazio, Santa Barbara, CA (US)

(73) Assignee: Matsushita Electric Industrial Co., Ltd., Osaka (JP)

(*) Notice: Subject to any disclaimer, the term of this patent is extended or adjusted under 35 U.S.C. 154(b) by 73 days.

(21) Appl. No.: 10/127,184

(22) Filed: Apr. 22, 2002

(65) Prior Publication Data

US 2003/0200085 A1 Oct. 23, 2003

(51) Int. Cl.[7] .......................... G10L 15/00; G06F 15/76
(52) U.S. Cl. ...................... 704/238; 704/231; 704/243; 704/254; 712/1
(58) Field of Search ................ 712/1; 710/7; 707/6; 704/257, 256, 254, 252, 251, 243, 242, 238, 231; 382/218, 209, 181

(56) References Cited

U.S. PATENT DOCUMENTS

| 5,459,798 A | * | 10/1995 | Bailey et al. ............... 382/218 |
| 6,249,761 B1 | * | 6/2001 | Phillips et al. .............. 704/231 |
| 6,526,380 B1 | * | 2/2003 | Thelen et al. ............... 704/251 |
| 2001/0041978 A1 | * | 11/2001 | Crespo et al. .............. 704/257 |

OTHER PUBLICATIONS

Gold, B., "Speech and Audio Signal Processing," 2000, John Wiley & Sons, Inc. pp. 103–110.*
Ravishankar, M., "Efficient Algorithms for Speech Recognition," May 1996, School of Computer Science, Carnegie Mellon University (CMU–CS–96–143), pp. 93.*
Lee et al., "A Fully Parallel Mandarin Speech Recognition System with Very Large Vocabulary and Almost Unlimited Texts," Jun. 1991, International Symposium on Circuits and System, IEEE, Jun. 1991, pp. 578–581.*
Mitchell et al., "A Parallel Implementation of a Hidden Markov Model with Duration Modeling for Speech Recognition," Jan. 1995, Digital Signal Processing, A Review Journal, 5(1).*

\* cited by examiner

*Primary Examiner*—Richemond Dorvil
*Assistant Examiner*—V. Paul Harper
(74) *Attorney, Agent, or Firm*—Harness, Dickey & Pierce, PLC

(57) ABSTRACT

A method is provided for improving pattern matching in a speech recognition system having a plurality of acoustic models. The improved method includes: receiving continuous speech input; generating a sequence of acoustic feature vectors that represent temporal and spectral behavior of the speech input; loading a first group of acoustic feature vectors from the sequence of acoustic feature vectors into a memory workspace accessible to a processor; loading an acoustic model from the plurality of acoustic models into the memory workspace; and determining a similarity measure for each acoustic feature vector of the first group of acoustic feature vectors in relation to the acoustic model. Prior to retrieving another group of acoustic feature vectors, similarity measures are computed for the first group of acoustic feature vectors in relation to each of the acoustic models employed by the speech recognition system. In this way, the improved method reduces the number I/O operations associated with loading and unloading each acoustic model into memory.

29 Claims, 7 Drawing Sheets

PATTERN MATCHING FOR LARGE VOCABULARY SPEECH RECOGNITION SYSTEMS

BACKGROUND OF THE INVENTION

The present invention relates generally to large vocabulary continuous speech recognition system, and more particularly, to a method for improving pattern matching in a large vocabulary continuous speech recognition system.

Pattern matching is one of the more computationally intensive aspect of the speech recognition process. Conventional pattern matching involves computing similarity measures for each acoustic feature vector in relation to each of the acoustic models. However, due to the large number of acoustic models, only a subset of acoustic models may be loaded into the available memory at any given time. In order to compute similarity measures for a given acoustic feature vector, conventional pattern matching requires a number of I/O operations to load and unload each of the acoustic models into the available memory space.

Therefore, it is desirable to provide an improved method of pattern matching that reduces the number I/O operations associated with loading and unloading each acoustic model into memory.

SUMMARY OF THE INVENTION

In accordance with the present invention, a method is provided for improving pattern matching in a speech recognition system having a plurality of acoustic models. The improved method includes: receiving continuous speech input; generating a sequence of acoustic feature vectors that represent temporal and spectral behavior of the speech input; loading a first group of acoustic feature vectors from the sequence of acoustic feature vectors into a memory workspace accessible to a processor; loading an acoustic model from the plurality of acoustic models into the memory workspace; and determining a similarity measure for each acoustic feature vector of the first group of acoustic feature vectors in relation to the acoustic model. Prior to retrieving another group of acoustic feature vectors, similarity measures are computed for the first group of acoustic feature vectors in relation to each of the acoustic models employed by the speech recognition system. In this way, the improved method reduces the number I/O operations associated with loading and unloading each acoustic model into memory.

For a more complete understanding of the invention, its objects and advantages, reference may be had to the following specification and to the accompanying drawings.

DETAILED DESCRIPTION OF THE PREFERRED EMBODIMENTS

Figure 1:
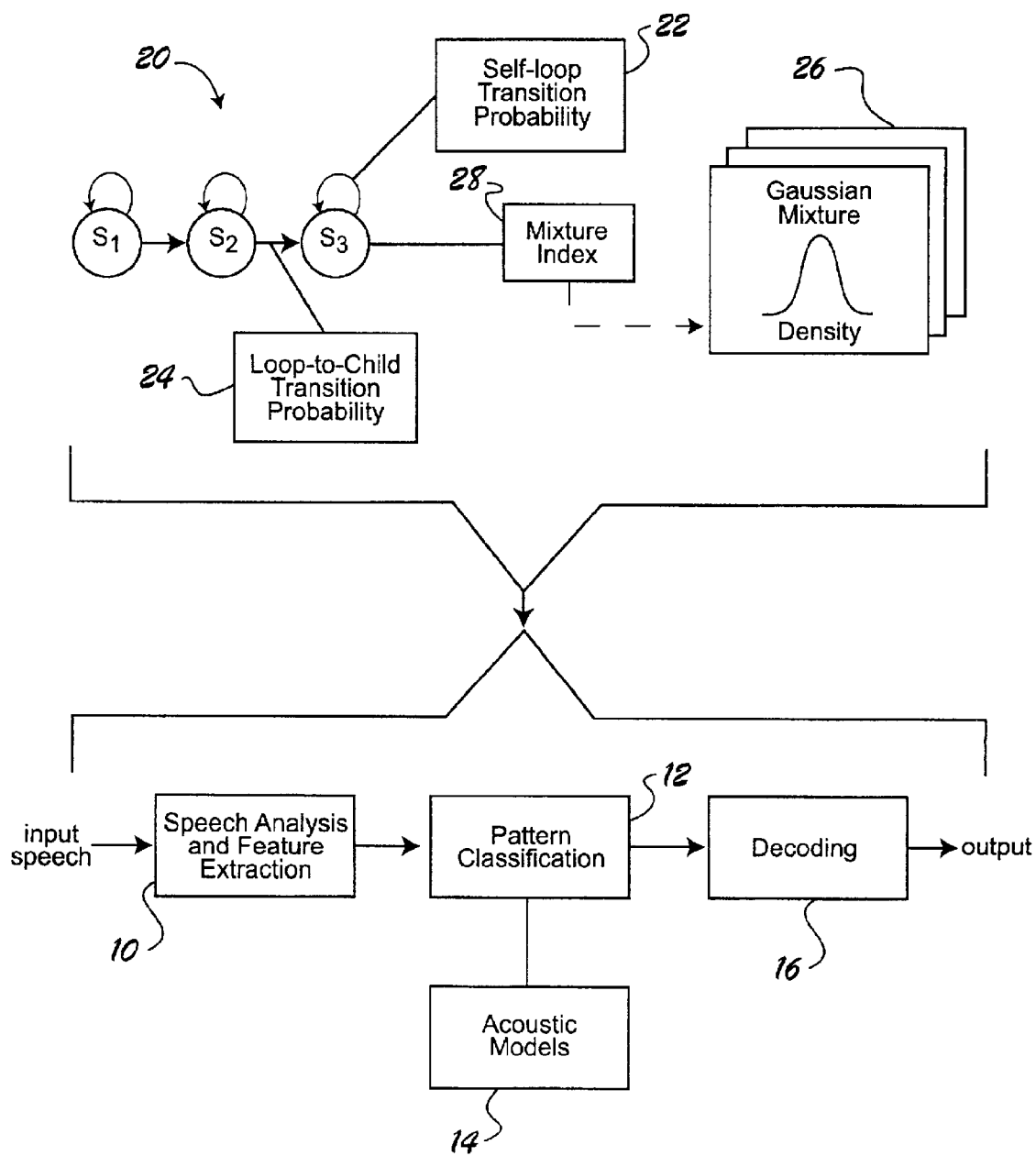
FIG. 1 is a block diagram depicting an exemplary speech recognition system.

FIG. 1 illustrates an exemplary speech recognition system. The system operates in two phases: a training phase, during which the system learns the reference patterns representing the different speech sounds (e.g., phrases, words, phones) that constitute the vocabulary of the application; and a recognition phase, during which an unknown input pattern is identified by considering the set of references. During the training phase, each reference is learned from spoken examples and stored either in the form of templates obtained by some averaging method (in template-matching systems) or acoustic models that characterize the statistical properties of patterns (like in stochastic systems). One of the most popular stochastic systems utilizes a statistical modeling approach employing Hidden Markov Models (HMM).

The exemplary speech recognizer performs the recognition process in three steps as shown in FIG. 1. First, speech analysis and feature extraction 10 is performed on the input speech. This step generates a sequence of acoustic feature vectors representing the temporal and spectral behavior of the speech input. In general, an input speech signal is partitioned into a sequence of time segments or frames. Spectral features are then extracted from each frame using a variety of well known techniques.

Next, acoustic pattern matching occurs at step 12. During this step, a similarity measure is computed between each frame of input speech and each reference pattern. The process defines a local measure of closeness between acoustic feature vectors and further involves aligning two speech patterns which may differ in duration and rate of speaking. The pattern classification step uses a plurality of acoustic models 14 generated during the training phase.

A diagram of a simple Hidden Markov Model is shown at 20 of FIG. 1. As noted above, Hidden Markov Models are commonly employed as acoustic models by speech recognition systems. For illustration purposes, a three-state Hidden Markov Model is depicted having the states designated $s_1$, $s_2$ and $s_3$. It is readily understood that HHMs could employ a different number of states. Moreover, it is understood that the present invention is not limited to HMMs, but is applicable to speech recognition systems employing other types of acoustic models.

Each Hidden Markov Model includes a collection of probabilities associated with the states themselves and transition amongst the states. Because probability values associated with each state may be more complex than a single value could represent, some systems will represent probability in terms of a Gaussian distribution. To provide a more robust model, a mixture of Gaussian distributions may be used in a blended manner to represent probability values as shown diagrammatically at 26 and referenced by a mixture index pointer 28. Thus, associated with each state is a mixture index pointer which in turn identifies the Gaussian mixture density data for that state.

Transitions amongst the states are illustrated by arrows. Each self-loop transition has an associated transition probability as depicted at 22; whereas each transition to another state also has an associated transition probability as depicted at 24. Likewise, transition probabilities may be represented by Gaussian distributions data or Gaussian mixture density data.

In the context of large vocabulary speech recognizers, Hidden Markov Models are typically used to model subword units, such as phonemes. However, speech recognition systems that employ word-level acoustic models or acoustic models based on another speech sub-component are also within the scope of the present invention. For more information regarding the basic structure of Hidden Markov Modeling, see Junqua, Jean-Claude and Haton, Jean-Paul, *Robustness in Automatic Speech Recognition, Fundamentals and Applications,* Kluwer Academic Publishers, 1996.

Speech recognition concludes with a decoding step 16. The probability that a particular phoneme was spoken is provided by the acoustic models as part of the pattern matching process. A sequence of words can then be constructed by concatenating the phonemes observed during the pattern matching process. The process of combining probabilities for each possible path and searching through the possible paths to select the one with highest probability is commonly referred to as decoding or searching. In other words, the decoding process selects a sequence of words having the highest probability given the observed input speech. A variety of well known searching algorithms may be used to implement the decoding process.

Figure 2:
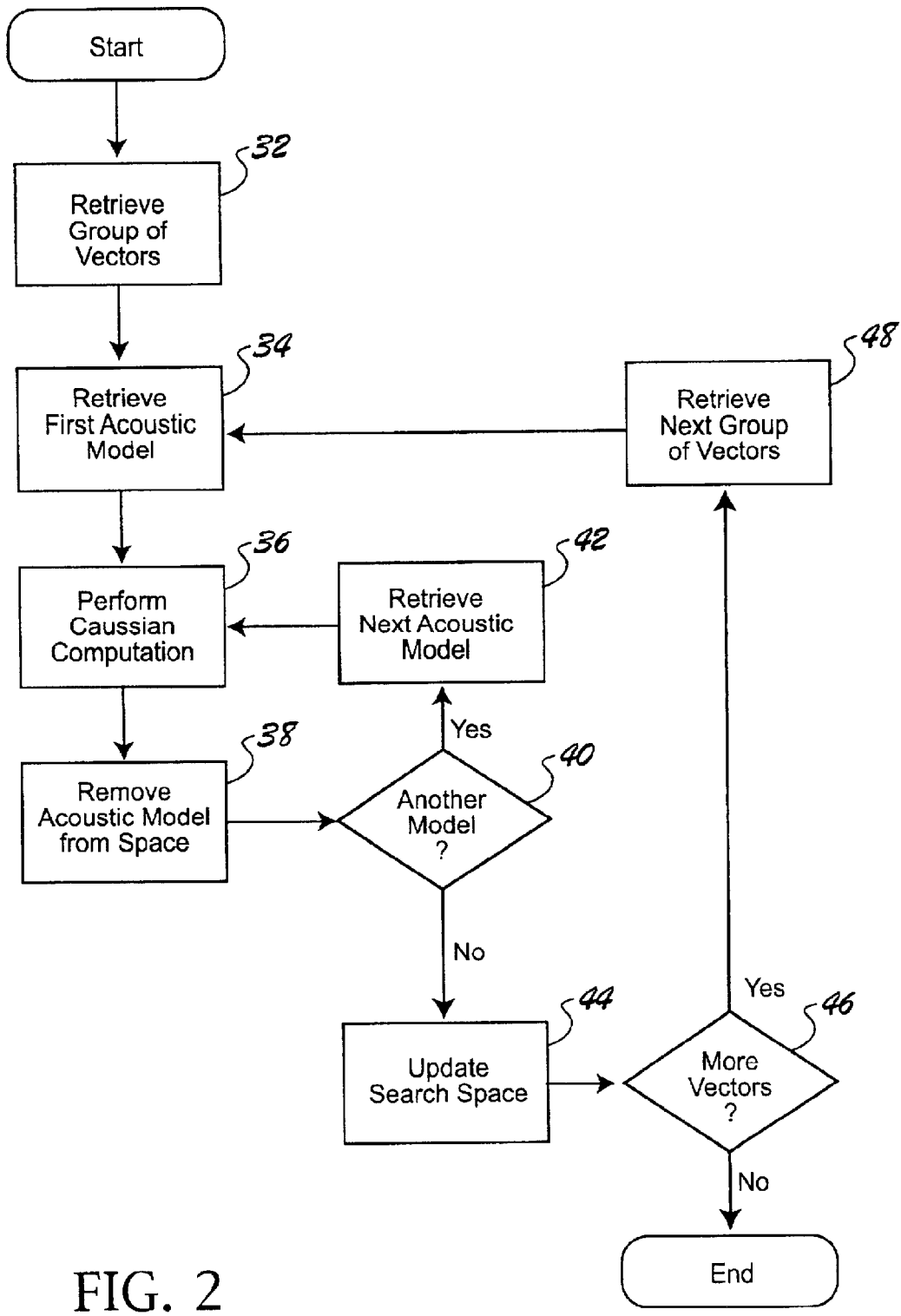
FIG. 2 is a flowchart illustrating a method for improving pattern matching in large vocabulary speech recognition systems in accordance with the present invention.

In one aspect of the present invention, an improved method is provided for performing pattern matching in a large vocabulary continuous speech recognition system as shown in FIG. 2. Rather than determine similarity measures for each acoustic feature vector as it is received, a group of acoustic feature vectors are buffered into cache memory that is accessible to a data processor. Similarity measures are then determined for each acoustic feature vector in the group of vectors. This improved method may be herein referred to as "horizontal caching".

Referring to FIG. 2, a first group of acoustic feature vectors is retrieved into a memory workspace at step 32. Similarly, one or more acoustic models are also loaded into the memory workspace at step 34, where the number of acoustic models loaded into memory is a subset of the acoustic models employed by the speech recognition system. In the case of HMMs, the Gaussian distribution data or Gaussian mixture density data which serves as the basis for the acoustic model is loaded into memory. One skilled in the art will readily recognize that the term "memory workspace" preferably refers to cache memory or some other data store readily accessible to the data processor. It is envisioned that the number of acoustic feature vectors associated with the first group and the number of acoustic models loaded into the memory workspace should be selected to optimize use of the available memory space.

A similarity measure can then be computed at step 36 for each acoustic feature vector in the first group of vectors. For example, a Gaussian computation may be performed for each acoustic feature vector as is well known in the art. Resulting similarity measures may be stored in an output memory space which is also accessible to the processor performing the computations. By performing the similarity computation for a group of acoustic feature vectors, the present invention reduces the number I/O operations required to load and unload each acoustic model.

Prior to retrieving additional acoustic models, the acoustic models currently resident in the memory workspace are removed at step 38. Additional acoustic models are then loaded into the memory space at step 42. Similarity measures are computed for each acoustic feature vector in the first vector group in relation to each of the additional acoustic models resident in the memory workspace at step 36. Again, the resulting similarity measures may be stored in an output memory space which is also accessible to the processor performing the computations. This process is repeated via step 40 until similarity measures are computed for the first group of acoustic feature vectors in relation to each of the acoustic models employed by the speech recognition system.

Once similarity measures have been determined for the first group of acoustic feature vectors, the search process is performed at step 44. In particular, the search process updates the search space based on the similarity measures for the first group of acoustic feature vectors. It is to be understood that this aspect of the present invention is not limited to a particular searching algorithm, but may be implemented using a variety of well known searching algorithms.

Contemporaneous with the search process, a subsequent group of acoustic feature vectors may be retrieved into the memory workspace at step 48. A similarity measure is computed for each acoustic feature vector in this subsequent group as described above. In other words, acoustic models are loaded and unloaded into the memory workspace and a Gaussian computation is performed for each acoustic feature vector in relation to the acoustic models resident in the memory workspace. This process is repeated via step 40 until similarity measures are computed for the subsequent group of acoustic feature vectors in relation to each of the acoustic models employed by the speech recognition system. It is envisioned that the first group of acoustic feature vectors is removed from the memory workspace prior to loading the subsequent group of acoustic feature vectors into the memory workspace. One skilled in the art will readily recognize that this is an iterative process that is performed for each of the acoustic feature vectors that represents the input speech.

Figure 3:
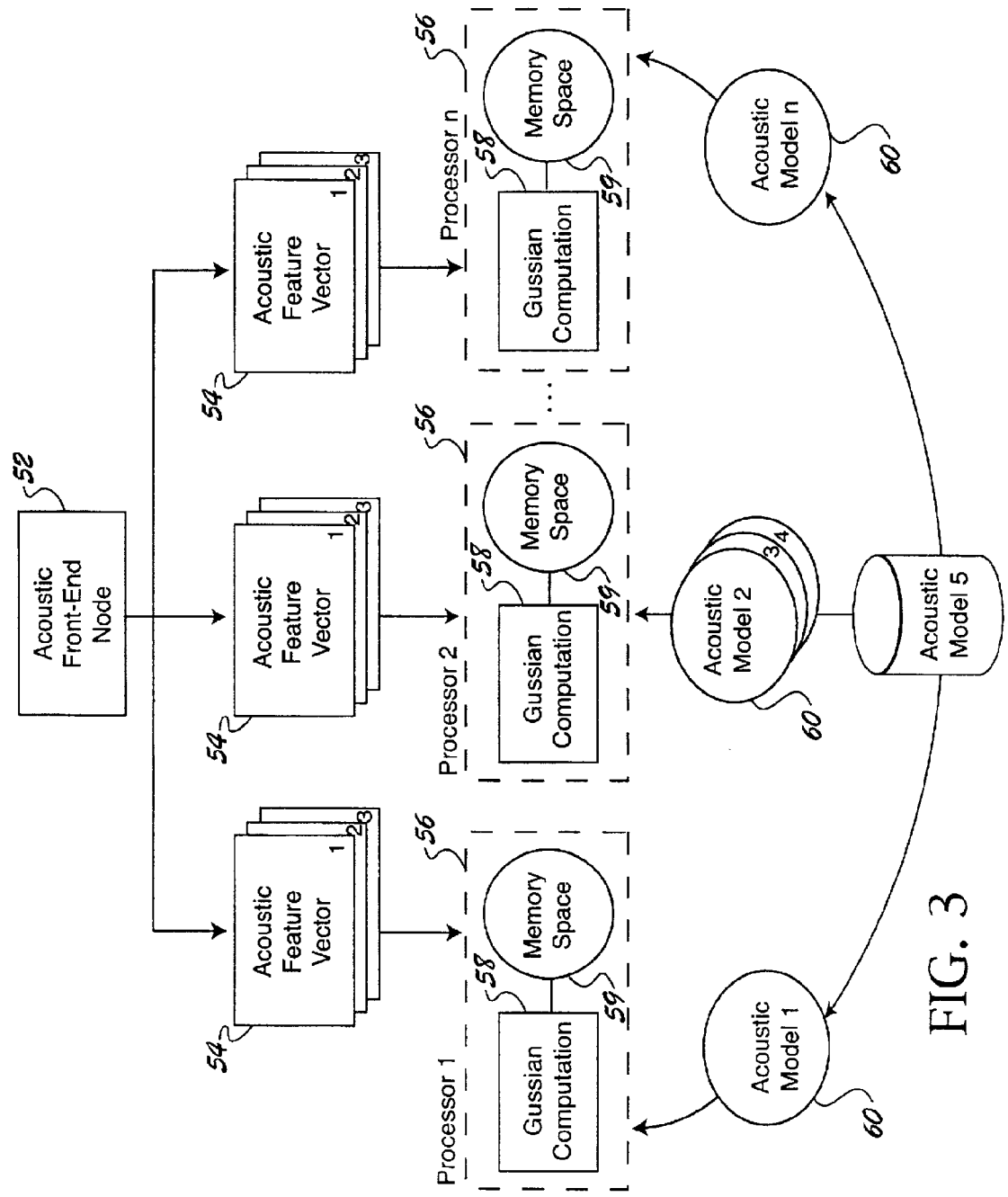
FIG. 3 is a block diagram illustrating how the improved method of pattern matching may be distributed across multiple processing nodes in accordance with the present invention.

It is further envisioned that the improved method for performing pattern matching may be distributed across multiple processing nodes as shown in FIG. 3. Rather than performing the pattern matching process on a single data processor, the process is partitioned among a plurality of processing nodes. As will be further described below, each processing node is responsible for computing similarity measures for a particular acoustic model or group of acoustic models.

An acoustic front-end node 52 is receptive of speech input and operable to generate a sequence of acoustic feature vectors as is known in the art. The acoustic front-end node 52 is further able to replicate the sequence of acoustic feature vectors 54 and distribute the replicated sequences 54 amongst the plurality of pattern matching nodes 56. It is envisioned that the replicated sequence of acoustic feature vectors may be partitioned into groups of vectors which are periodically or upon request communicated to the plurality of pattern matching nodes.

Each pattern matching node 56 is comprised of a data processor 58 and a memory space 59 accessible to the data processor 58. To perform pattern matching, each pattern matching node 56 is adapted to receive the replicated sequence of acoustic feature vectors 54 from the acoustic frontend node 52. As described above, each pattern matching node 56 is operable to load one or more acoustic models 60 into a resident memory space, and then determine similarity measures for each acoustic feature vector in relation to the loaded acoustic models. In this approach, each pattern matching node 56 is responsible for a predetermined range of acoustic models, such that computation of similarity measures for a given acoustic feature vector or group of vectors can occur in parallel, thereby further improving the overall performance of the speech recognition process.

Figure 4A:
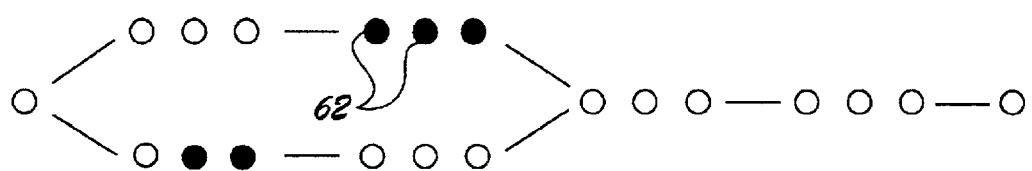
FIGS. 4A–4C are diagrams illustrating how the decoding processing may be distributed amongst various processing nodes in accordance with the present invention.

In another aspect of the present invention, the decoding process may be distributed amongst a plurality of processing nodes. In general, the search space is comprised of observed acoustic data (also referred to as the potential search space). Referring to FIG. 4A, the search space may be diagrammatically represented as a plurality of nodes 62, where each node signifies a state of a certain phoneme of a certain word of a certain word history for language model conditioning. The states of all phonemes of all of the words comprise the search space. The search space may be further segmented to include a potential search space and an active search space. The active search space is the area being explored by a search algorithm at a given time. In contrast, the potential search space is defined as the maximum possible active search space. In FIG. 4A, the black nodes indicate the active search space; whereas all of the nodes comprise the potential search space.

Figure 4B:
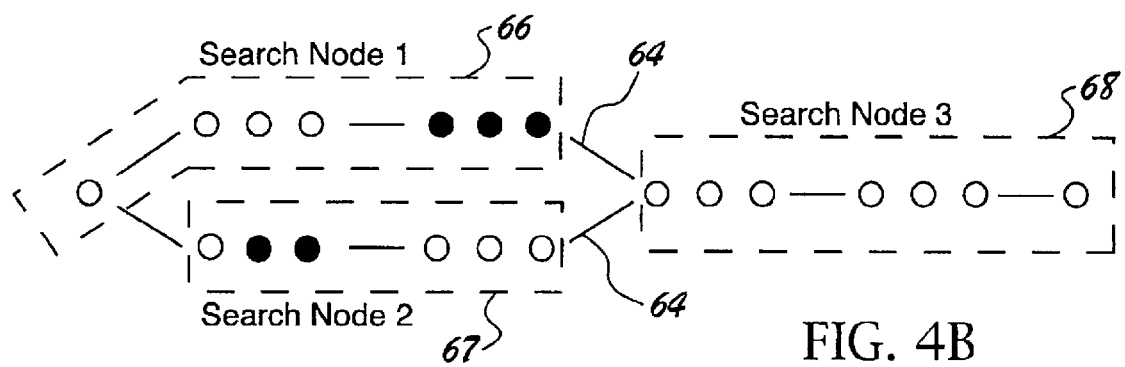

To further reduce computational processing, the observed acoustic data may be partitioned amongst a plurality of processing nodes as shown in FIG. 4B. A searching operation is then performed on the observed acoustic data allocated to each processing node, such that at least some of the searching operations occur concurrently on different processing nodes. Although a Viterbi searching algorithm is presently preferred, it is readily understood that other known search algorithms, such as a stack decoding algorithm, a multi-pass search algorithm or a forward-backward search algorithm, are within the scope of the present invention.

Partitioning the observed acoustic data further includes defining link data 64 that is indicative of the relationships between the segmented acoustic data residing at the different processing nodes. Since each processing node only evaluates a subset of the observed acoustic data, link data is maintained at each of the processing nodes. As further describe below, changes in the link data is communicated amongst the plurality of processing nodes.

Figure 4C:
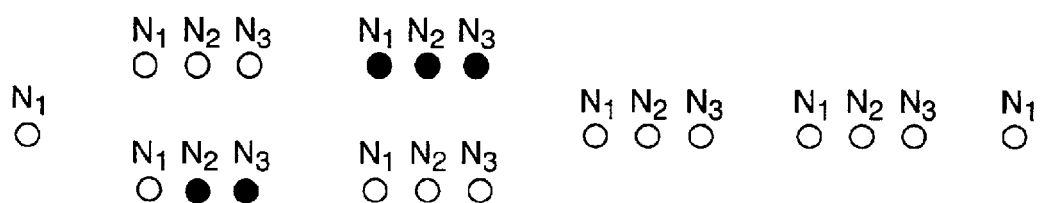

In FIG. 4B, the search space is segmented in a manner that minimizes the number of required links amongst the segmented acoustic data. However, this division does not maximize the available processing power. The searching operation associated with a third processing node 68 is dependent upon the completion of the searching operations associated with a first processing node 66 and a second processing node 67. Alternatively, the search space may be partitioned as shown in FIG. 4C. In this case, each state of a certain phoneme is sequentially assigned to a different processing node. Although this exemplary division provides a better utilization of the available processing power, it also requires a considerable amount of link data. Similarly, it is also envisioned that the observed acoustic data may be allocated in proportion to the processing power associated with each processing node From such discussions, it is readily understood that the search space may be partitioned in accordance with a predefined criteria including but not limited to the criteria (or combinations thereof) discussed above.

For illustration purposes, a decoding process based on lexical trees is further described below. Lexical trees generally represent the pronunciations of words in the vocabulary and may be constructed by concatenating the phonemes observed during the pattern matching process. Each node in a lexical tree is associated to a state of a certain phoneme of a certain word of a certain word history for language model conditioning. The states of all phonemes of all words have been compiled into lexical trees. These trees are replicated for word history language model conditioning.

Figure 5:
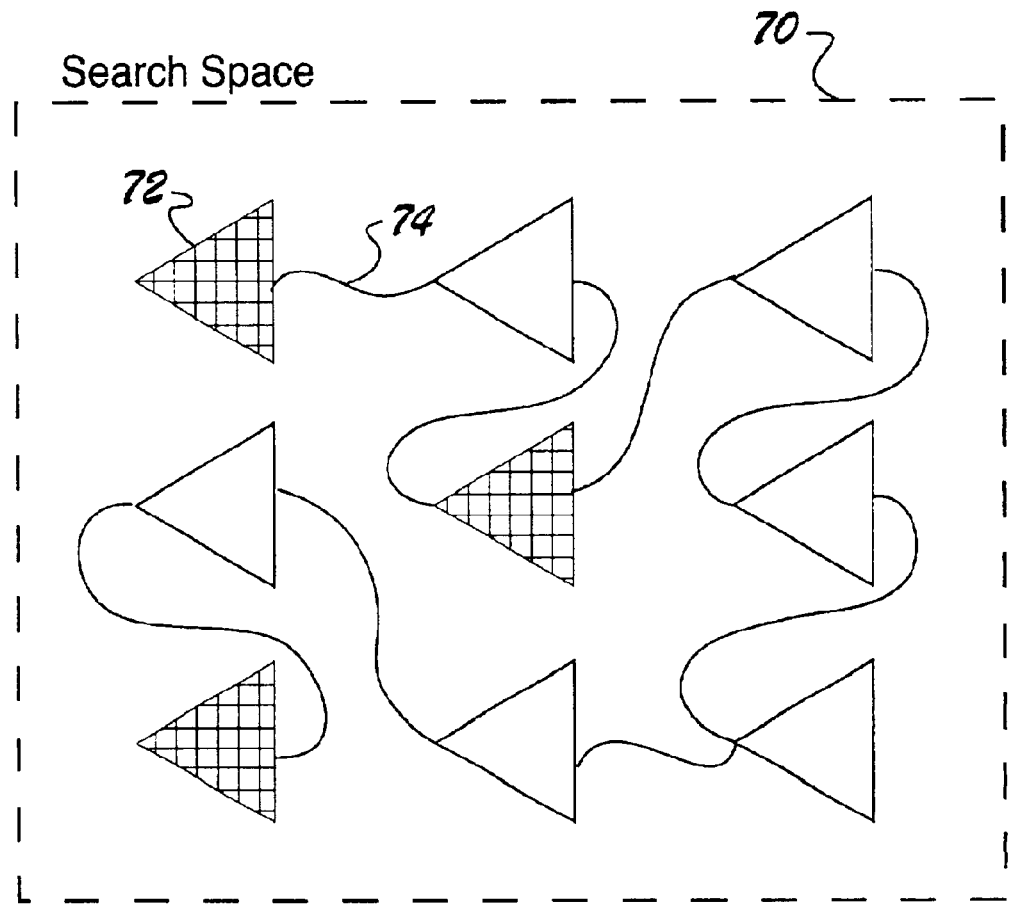
FIG. 5 is a diagram depicting an exemplary lexical search space.

Referring to FIG. 5, the search space 70 is comprised of a plurality of lexical trees 72. In this case, one or more lexical trees may be allocated to a particular processing node. A terminating node in a lexical tree signifies a unique word in the lexicon. Links 74 are used to interconnect selective terminating nodes of different lexical trees 72, thereby forming likely word sequences. To derive at the most likely word sequence, a searching algorithm, such as the Viterbi searching algorithm, is used to traverse the lexical trees in a manner that is well known in the art.

Figure 6:
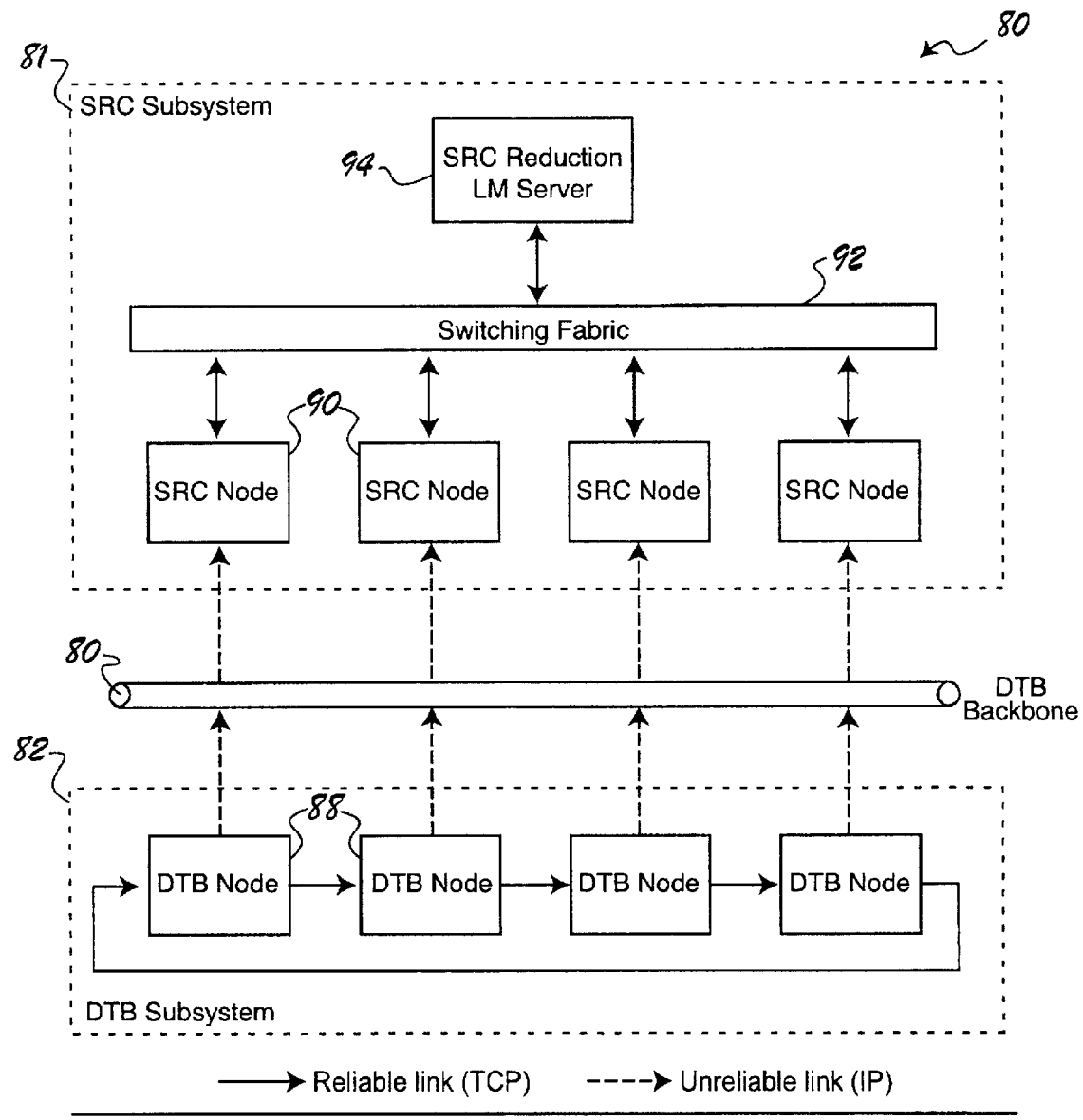
FIGS. 6 and 7 are block diagrams depicting distributed architectural arrangements for large vocabulary speech recognition systems in accordance with the present invention.

FIG. 6 illustrates an architecture that further distributes the speech recognition process across multiple processing nodes in accordance with the present invention. The distributed architecture 80 is comprised of a pattern matching subsystem 82 and a lexical searching subsystem 84 interconnected by a communication link 86.

The pattern matching subsystem 82 is comprised of a plurality of pattern matching nodes 88. To perform pattern matching, each pattern matching node 88 is adapted to receive a replicated sequence of acoustic feature vectors from an acoustic front-end node (not shown). As described above, each pattern matching node 88 determines similarity measures for a predetermined range of acoustic models, such that computation of similarity measures for a given acoustic feature vector occurs in parallel. Resulting similarity measures are then communicated from each of the pattern matching nodes 88 via the communication link 86 to the lexical search subsystem 84.

Resulting similarity measures are preferably communicated in a multicast mode over an unreliable link. A reliable link typically require a connection protocol, such as TCP, which guarantees that the information is received by the intended recipient. Reliable links are typically more expensive in term of bandwidth and latency, and thus should only be used when data needs to be received. In contrast, an unreliable link usually does not require a connection to be opened but does not guarantee that all transmitted data is received by the recipient. In an exemplary embodiment, the communication link 86 is a standard Ethernet link (e.g., 100 Mbits/sec). Although an unreliable link is presently preferred to maximize throughout, a reliable link may also be used to communicate similarity measures between the pattern matching subsystem and the lexical searching subsystem.

Similarly, the lexical search subsystem 84 is comprised of a plurality of searching nodes 90. The search space is partitioned such that each searching node 90 is responsible for evaluating one or more of the lexical trees which define the search space. To do so, each searching node 90 is adapted to receive similarity measures from each of the pattern matching nodes 88 in the pattern matching subsystem 82.

If a searching node does not receive some of the similarity measure data that it needs, the node could either compute it or ask for it to be retransmitted. To recompute similarity measures, the searching node would need to access to all of the acoustic models which could constitute a considerable memory use. On the other hand, retransmitting similarity measures is equivalent to implementing reliable multicast. Although the approach is expensive in terms of bandwidth and especially in terms of latency, it may be feasible in some applications.

For instance, the latency problem due to retransmissions inherent with the reliable multicast mode may not be a problem in the horizontal caching technique described above. To maximize throughput on the communication link, assume that a daisy chain is constructed with reliable links between the pattern matching nodes 88. The daisy chain is used to synchronize the transmission of the similarity measures using a round-robin approach. This approach has the advantage that the pattern matching nodes would not try to write on the shared link at the same time, thereby creating collisions and possible retransmissions.

Using this approach, the first pattern matching node would write the first 10 frames (equivalent to 100 milliseconds of speech) of its output cache on the shared non-reliable link. The first node then signals the next node on the chain that it is now its turn to transmit data. The next node will transmit its data and then signal yet another node. Assuming 8 pattern matching nodes, the total amount of data each node will have to send over the shared medium is 10 frames×10 kminutes/8 nodes×4 bytes 50 Kbytes=0.4 Mbits. To complete this process for 8 nodes, it takes 32 milliseconds over a 100 Mbits per second shared link, not accounting for overhead, latency due to the transmission and synchronization of the daisy chain. Since only one third of the total aggregate bandwidth of the communication link has been used, the remainder of the bandwidth could be used for retransmission associated with the reliable multicast. One skilled in the art will readily recognize that if the latencies are too high, the horizontal caching technique provides the flexibility to increase the batch size to more than 10 frames, therefore reducing the sensivity to latencies.

Each searching node 90 only processes a subset of the lexical trees in the search space. To do so, each searching node 90 needs to know the state of its associated lexical trees as well as data indicating the links between all of the lexical trees in the search space. Thus, each searching node further includes a data store for maintaining the link data.

Since processing of associated lexical trees by a searching node may result in changes to the link data, each searching node 90 is further operable to communicate changes to the link data to each of the other searching nodes in the lexical search subsystem. Here, the communication problem is more difficult because synchronization up to the frame time (e.g., 10 milliseconds) and reliability must be guaranteed. Although a shared communication link may be feasible, a switching network is preferably used to link searching node in the lexical search subsystem. In particular, each searching node 80 is interconnected by a switching fabric 92 having a dedicated link.

In operation, each searching node 90 will be listening and reading the similarity measures from the pattern matching subsystem 82. In this case, each searching node 90 is multi-threaded, so that reading from the communication link can be done in parallel with processing of lexical trees. At the end of each frame, each search node 90 will send the likely word endings and a few other statistics (e.g., likelihoods histograms used to adapt the beam search) to a search reduction server 94. The search reduction server 94 is operable to combine information about word endings, apply a language model to generate a new (global) search state and sent the search state back (in multicast mode) to each searching node 90. All of this process has to be accomplished in a time window smaller that the frame rate, and in a reliable way, since the search state has to be maintained consistent across all nodes. Therefore, efficient reliable multicast is preferably employed. In addition, the search reduction server is further operable to generate the recognized sentence and to compute statistics, like the confidence measure or the speaker id, as post processing.

Figure 7:
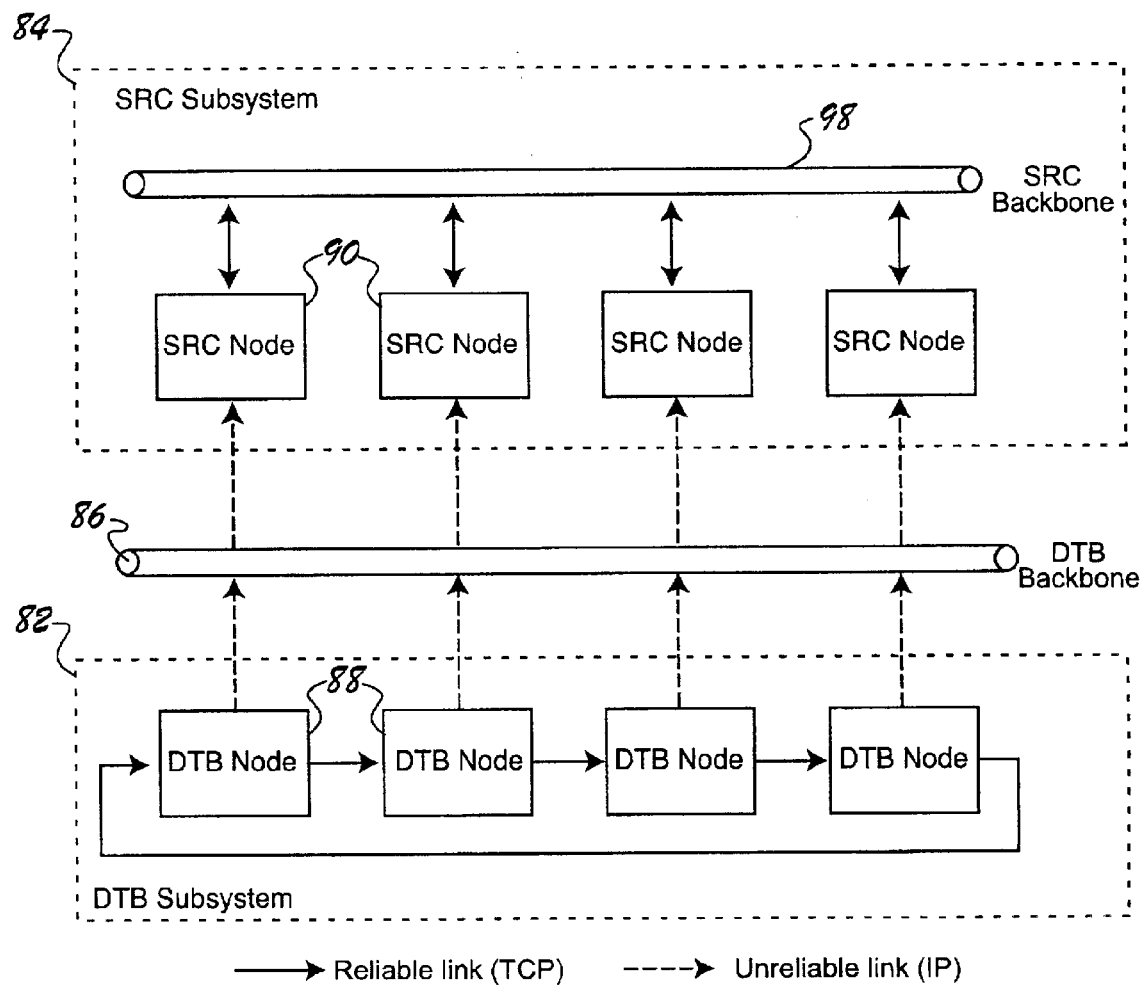

FIG. 7 illustrates an alternative distributed architecture were the searching nodes 90 are directly linked between with a shared medium 98. Assuming that each searching node 90 is independently performing the search reduction processes in a distributed way, there is no need for a search reduction server. However, each node will have to store the language model and employ an N to N reliable multicast communication mode. This solution may be less expensive but more difficult to implement.

Reducing the size of the search space is another known technique for reducing computational processing associated with the decoding processing. Histogram pruning is one known technique for reducing the number of active nodes residing in the search space. One known technique for achieving N best (or approximately N best) pruning is through the computation of a histogram. The histogram represents the probability density function of the scores of the nodes. It is defined as y=f(X), where X is the score and y is the number of nodes a given time t with the score. Since scores are real numbers, X does not represent a specific value, but rather a range.

For illustration purposes, a simplistic example of histogram pruning is provided below. Suppose we have 10 active states at time t, and that we should wish to retain only 5 of them. Assume the active states are as follows:

s0: score 3 associated to node n0
s1: score 2 associated to node n1
s2: score 5 associated to node n2
s3: score 4 associated to node n3
s4: score 4 associated to node n4
s5: score 3 associated to node n5
s6: score 5 associated to node n6
s7: score 3 associated to node n7
s8: score 2 associated to node n8
s9: score 5 associated to node n9

Thus, the histogram maps:

f(2)=2 (states s1, and s8)
f(3)=3 (states s0, s5, s7)
f(4)=2 (states s3 and s4)
f(5)=3 (states s2, s6, s9)

We do not need to know which states are associated with which value of X, and therefore a simple array y=f(X) is sufficient.

Next, to identify the N=5 best, we just look at the histogram to compute the threshold, T, corresponding to the pruning. If T=6 or above, no states satisfy score(s)>=T. If T=5, then add backwards the number of nodes s which satisfy score(s)>=T: f(5)=3. In this case, only three node meet the threshold. Since three nodes is insufficient to meet our pruning criteria (3<N=5), then we continue by setting T=4. In this case, five nodes meet the threshold. The threshold (T=4), can then be applied to the list of nodes as follows:

s0: score 3 associated to node n0===>remove
s1: score 2 associated to node n1===>remove
s2: score 5 associated to node n2===>KEEP
s3: score 4 associated to node n3===>KEEP
s4: score 4 associated to node n4===>KEEP
s5: score 3 associated to node n5===>remove
s6: score 5 associated to node n6===>KEEP
s7: score 3 associated to node n7===>remove
s8: score 2 associated to node n8===>remove
s9: score 5 associated to node n9===>KEEP Histogram pruning may be implemented in the distributed environment of the present invention as described below.

Assume the search space is divided amongst three search nodes, K1, K2, and K3, such that: s0: score 3 processed by node K1 s1: score 2: processed by node K2
s2: score 5: processed by node K3
s3: score 4: processed by node K1
s4: score 4: processed by node K1
s5: score 3: processed by node K1
s6: score 5: processed by node K2
s7: score 3: processed by node K2
s8: score 2: processed by node K3
s9: score 5: processed by node K3

To identify 5 active states, each search processing node computes its own histogram as follows:

K1: f(3)=2 (s0 and s5), f(4)=2 (s3 and s4)
K2: f(2)=1 (s1), f(3)=1 (s6), f(5)=1 (s6)
K3: f(2)=1 (s8), f(5)=2 (s2,s9)

Unfortunately, this example, is not very exemplary of the distribution of scores. The distribution is typically in an identifiable form, such as exponential. In other words, $y=f(M-X)=alpha*exp(1/alpha*(M-X))$. In this case, the threshold may be computed from estimations for the parameters alpha and M. Specifically, the threshold is $T=M-1/alpha*\log N$, where M is the maximum score and the expectation (average value) is $M-1/alpha$.

To compute the threshold, an algorithm is implemented at each searching node. The algorithm involves looping through all the nodes and computing the mean value and max value of all scores. Let Mk denote the max score on search processing node Kk, Ek denote the mean value of the scores on node Kk, and Wk be the number of active nodes on Kk, where k=1, 2 . . . n.

The overall threshold may be recovered by using Mk, Ek, and Wk from each of the searching nodes. The overall maximum M is equal to the largest Mk and the overall mean is 1/(sum Wk)*(sum of Wk*Ek). Since Mk, Ek, and Wk are the only entities that need to be transmitted, they are called sufficient statistics for the computation of the threshold T. Furthermore, these statistics are much smaller than the large array y=f(X).

Based on these sufficient statistics, computation of a threshold is done at one of the processing nodes (possibly the root node) and then transmitted back to each of the search nodes. The threshold is applied to the active nodes at each processing node as previously explained.

The foregoing discloses and describes merely exemplary embodiments of the present invention. One skilled in the art will readily recognize from such discussion, and from accompanying drawings and claims, that various changes, modifications, and variations can be made therein without departing from the spirit and scope of the present invention.

What is claimed is:

1. A method for improving the decoding process in a speech recognition system, comprising:
    generating a search space that is comprised of observed acoustic data, the search space having an active search space;
    partitioning the active search space amongst a plurality of processing nodes;
    segmenting the active search space in a manner that minimizes links and allocating segmented active search space amongst the plurality of the processing nodes in proportion to processing power associated with each processing node; and
    performing a searching operation on the active search space allocated to each processing node, such that searching operations occur concurrently on at least two of the plurality of processing nodes.

2. The method of claim 1 further comprises defining the active search space as a plurality of lexical trees and distributing the plurality of lexical trees amongst the plurality of processing nodes.

3. The method of claim 2 further comprises maintaining link data indicative of links between the lexical trees at each of the plurality of processing nodes and communicating changes in the link data amongst the plurality of processing nodes.

4. The method of claim 1 wherein the step of partitioning the active search space further comprises allocating the active search space amongst the plurality of the processing nodes based on available processing power associated with each processing node.

5. The method of claim 1 wherein the step of performing a searching operation on the observed acoustic data further comprises defining the search operation as at least one of a Viterbi search algorithm, a stack decoding algorithm, a multi-pass search algorithm and a forward-backward search algorithm.

6. A distributed architectural arrangement for a speech recognition system, the speech recognition system operable to generate a search space defined by a plurality of lexical trees, comprising:
    a first searching node having a first data processor and a first memory space accessible to the first data processor, the first searching node adapted to receive similarity measures that correlate speech input to a plurality of acoustic models and operable to evaluate a first lexical tree based on the similarity measures;
    a second searching node having a second data processor and a second memory space accessible to the second data processor, the second searching node adapted to receive the similarity measures and operable to evaluate a second lexical tree based on the similarity measures;
    a communication link interconnecting the first and second searching nodes; and
    a pattern matching node adapted to receive acoustic feature vector data indicate of the speech input and operable to determine similarity measures for the acoustic feature vector data in relation to the plurality of acoustic models, the pattern matching node further operable to communicate similarity measures over an unreliable second communication link to each of the first searching node and the second searching node.

7. The distributed architectural arrangement of claim 6 wherein the plurality of lexical trees are interconnected by one or more links and each of the searching nodes maintains link data indicative of the links amongst the plurality of lexical trees.

8. The distributed architectural arrangement of claim 7 wherein at least one of the first searching node and the second searching node is operable reduce the search space by performing histogram pruning.

9. The distributed architectural arrangement of claim 8 wherein the histogram statistics is further defined as a maximum score value, a mean score value and a number of active nodes associated with the searching node.

10. The distributed architectural arrangement of claim 8 wherein each searching node is operable to compute a histogram associated with its processing and communicate statistics indicative of the histogram to the other searching node.

11. The distributed architectural arrangement of claim 7 wherein the evaluation of the first lexical tree by the first searching node results in changes to the link data, such that the first searching node is further operable to communicate the changes to the link data across the communication link to the second searching node.

12. The distributed architectural arrangement of claim 7 wherein the first searching node initiates communication of the changes to the link data prior to completing the evaluation of the first lexical tree.

13. The distributed architectural arrangement of claim 6 wherein at least one of the first searching node and the second searching node is operable to request retransmission of similarity measures from the pattern matching node upon detecting an error in the transmission of the similarity measures from the pattern matching node.

14. The distributed architectural arrangement of claim 13 wherein at least one of the first searching node and the second searching node is operable to recompute similarity measures upon detecting an error in the transmission of the similarity measures from the pattern matching node.

15. A distributed architectural arrangement for a speech recognition system, the speech recognition system operable to generate a search space defined by a plurality of lexical trees, comprising:

a first searching node having a first data processor and a first memory space accessible to the first data processor, the first searching node adapted to receive similarity measures that correlate speech input to a plurality of acoustic models and operable to evaluate a first lexical tree based on the similarity measures;

a second searching node having a second data processor and a second memory space accessible to the second data processor, the second searching node adapted to receive the similarity measures and operable to evaluate a second lexical tree based on the similarity measures; and a communication link interconnecting the first and second searching nodes, wherein the plurality of lexical trees are interconnected by one or more links and each of the searching nodes maintains link data indicative of the links amongst the plurality of lexical trees and, wherein the first searching node initiates communication of the changes to the link data prior to completing the evaluation of the first lexical tree.

16. The distributed architectural arrangement of claim 15 further comprises a pattern matching node adapted to receive acoustic feature vector data indicate of the speech input and operable to determine similarity measures for the acoustic feature vector data in relation to the plurality of acoustic models, the pattern matching node further operable to communicate similarity measures over an unreliable second communication link to each of the first searching node and the second searching node.

17. The distributed architectural arrangement of claim 16 wherein at least one of the first searching node and the second searching node is operable to request retransmission of similarity measures from the pattern matching node upon detecting an error in the transmission of the similarity measures from the pattern matching node.

18. The distributed architectural arrangement of claim 17 wherein at least one of the first searching node and the second searching node is operable to recompute similarity measures upon detecting an error in the transmission of the similarity measures from the pattern matching node.

19. The distributed architectural arrangement of claim 15 wherein at least one of the first searching node and the second searching node is operable reduce the search space by performing histogram pruning.

20. The distributed architectural arrangement of claim 19 wherein each searching node is operable to compute a histogram associated with its processing and communicate statistics indicative of the histogram to the other searching node.

21. The distributed architectural arrangement of claim 19 wherein the histogram statistics is further defined as a maximum score value, a mean score value and a number of active nodes associated with the searching node.

22. A distributed architectural arrangement for a speech recognition system, the speech recognition system operable to generate a search space defined by a plurality of lexical trees interconnected by one or more links, comprising:

a first searching node having a first data processor and a first memory space accessible to the first data processor, the first searching node adapted to receive similarity measures that correlate speech input to a plurality of acoustic models and operable to evaluate a first lexical tree based on the similarity measures;

a second searching node having a second data processor and a second memory space accessible to the second data processor, the second searching node adapted to receive the similarity measures and operable to evaluate a second lexical tree based on the similarity measures, wherein each of the searching nodes maintains link data indicative of the links amongst the plurality of lexical trees and at least one of the first searching node and the second searching node is operable reduce the search space by performing histogram pruning; and a communication link interconnecting the first and second searching nodes.

23. The distributed architectural arrangement of claim 22 wherein the evaluation of the first lexical tree by the first searching node results in changes to the link data, such that the first searching node is further operable to communicate the changes to the link data across the communication link to the second searching node.

24. The distributed architectural arrangement of claim 22 wherein the first searching node initiates communication of the changes to the link data prior to completing the evaluation of the first lexical tree.

25. The distributed architectural arrangement of claim 22 further comprises a pattern matching node adapted to receive acoustic feature vector data indicate of the speech input and operable to determine similarity measures for the acoustic feature vector data in relation to the plurality of acoustic models, the pattern matching node further operable to communicate similarity measures over an unreliable second communication link to each of the first searching node and the second searching node.

26. The distributed architectural arrangement of claim 25 wherein at least one of the first searching node and the second searching node is operable to request retransmission of similarity measures from the pattern matching node upon detecting an error in the transmission of the similarity measures from the pattern matching node.

27. The distributed architectural arrangement of claim 26 wherein at least one of the first searching node and the second searching node is operable to recompute similarity measures upon detecting an error in the transmission of the similarity measures from the pattern matching node.

28. The distributed architectural arrangement of claim 22 wherein each searching node is operable to compute a histogram associated with its processing and communicate statistics indicative of the histogram to the other searching node.

29. The distributed architectural arrangement of claim 22 wherein the histogram statistics is further defined as a maximum score value, a mean score value and a number of active nodes associated with the searching node.

* * * * *